US011858781B2

(12) United States Patent
Pu et al.

(10) Patent No.: US 11,858,781 B2
(45) Date of Patent: Jan. 2, 2024

(54) FRICTIONLESS ELECTRONIC SAFETY ACTUATOR

(71) Applicant: Otis Elevator Company, Farmington, CT (US)

(72) Inventors: Yu Pu, Farmington, CT (US); Yingxin Gao, Farmington, CT (US); Ruben Marante-Chasco, Madrid (ES)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 17/856,463

(22) Filed: Jul. 1, 2022

(65) Prior Publication Data

US 2023/0139867 A1 May 4, 2023

(30) Foreign Application Priority Data

Nov. 4, 2021 (EP) .................................... 21382999

(51) Int. Cl.
*B66B 7/04* (2006.01)
*B66B 5/22* (2006.01)

(52) U.S. Cl.
CPC ................ *B66B 7/044* (2013.01); *B66B 5/22* (2013.01)

(58) Field of Classification Search
CPC .................................. B66B 5/22; B66B 7/044
See application file for complete search history.

(56) References Cited

U.S. PATENT DOCUMENTS

2007/0051563 A1 3/2007 Oh et al.

FOREIGN PATENT DOCUMENTS

| | | | | | |
|---|---|---|---|---|---|
| EP | 1733992 | A1 * | 12/2006 | ............... | B66B 5/18 |
| EP | 3519339 | A1 | 8/2019 | | |
| EP | 3604196 | A1 | 2/2020 | | |
| EP | 3819250 | A1 * | 5/2021 | ............... | B66B 1/36 |
| ES | 2887940 | A1 * | 12/2021 | | |
| JP | 2022551320 | * | 12/2022 | | |
| WO | WO-2008057116 | A1 * | 5/2008 | ............... | B66B 5/22 |
| WO | WO-2020187757 | A1 * | 9/2020 | ............... | B66B 5/18 |

OTHER PUBLICATIONS

European Search Report for application EP 21382999.7, dated May 24, 2022, 59 pages.

* cited by examiner

*Primary Examiner* — Diem M Tran
(74) *Attorney, Agent, or Firm* — CANTOR COLBURN LLP

(57) ABSTRACT

A frictionless electronic safety actuator (100) for use in an elevator system, which includes at least one electromagnet (110), and a magnetic plate (120) attached to a connection arrangement (190). The connection arrangement (190) is configured to connect the magnetic plate (120; 220) to a linkage (80) that is actuatable so as to move a safety brake (24) into frictional engagement with an elevator guide rail (20). The at least one electromagnet (110) is operable to selectively produce a magnetic force which acts upon the magnetic plate (120) to displace the magnetic plate (120) and thereby move the connection arrangement (190) to actuate the linkage (80) without the magnetic plate (120) coming into frictional engagement with the elevator guide rail (20).

8 Claims, 6 Drawing Sheets

FRICTIONLESS ELECTRONIC SAFETY ACTUATOR

FOREIGN PRIORITY

This application claims priority to European Patent Application No. 21382999.7, filed Nov. 4, 2021, and all the benefits accruing therefrom under 35 U.S.C. § 119, the contents of which in its entirety are herein incorporated by reference.

TECHNICAL FIELD

The present disclosure relates to frictionless electronic safety actuators for use in an elevator system.

BACKGROUND

It is known in the art to mount safety brakes onto elevator components moving along guide rails, to bring the elevator component quickly and safely to a stop, especially in an emergency. In many elevator systems the elevator car is hoisted by a tension member with its movement being guided by a pair of guide rails. Typically, a governor is used to monitor the speed of the elevator car. According to standard safety regulations, such elevator systems must include an emergency braking device (known as a safety brake, "safety gear" or "safety") which is capable of stopping the elevator car from moving downwards, even if the tension member breaks, by gripping a guide rail. Safety brakes may also be installed on the counterweight or other components moving along guide rails.

Electronic Safety Actuators (ESA's) are now commonly used instead of just using mechanical governors to trigger a safety brake. ESA's typically activate a safety brake by dragging a magnet (either a permanent magnet or an electromagnet) against the guide rail, and using the friction to pull up on a linkage attached to the safety brake. The reliance on the friction interaction between a magnet and the guide rail has a number of problems, especially in high-rise elevator systems, as the interaction between the magnet and the guide rail causes wear on the guide rail, and can induce chipping, as well as debris accumulation. Any degradation of guide rail condition is of concern as it affects the safety of the whole elevator system.

There is therefore a need to improve electronic safety actuation of the safety brakes.

SUMMARY

According to a first aspect of this disclosure there is provided a frictionless electronic safety actuator for use in an elevator system, comprising: at least one electromagnet and a magnetic plate attached to a connection arrangement; wherein the connection arrangement is configured to connect the magnetic plate to a linkage that is actuatable so as to move a safety brake into frictional engagement with an elevator guide rail; and wherein the at least one electromagnet is operable to selectively produce a magnetic force which acts upon the magnetic plate to displace the magnetic plate and thereby move the connection arrangement to actuate the linkage without the magnetic plate coming into frictional engagement with the elevator guide rail.

It will be appreciated that, according to the present disclosure, the frictionless electronic safety actuator provides actuation for a safety brake, without the aid of frictional contact between the electronic safety actuator and the guide rail. This provides the advantage that actuation of the safety brake is not affected by the state of the elevator guide rail, so no debris from the elevator hoistway or dirt from the elevator guide rail can interfere with the actuation of the frictionless electronic safety actuator.

It will furthermore be appreciated that the location of the frictionless electronic safety actuator is no longer restricted by the need for contact with the guide rail, and can be positioned anywhere on an elevator component where the linkage can then actuate the safety brake. Therefore, in some examples no component of the frictionless electronic safety actuator comes into frictional contact with the elevator guide rail.

It will be understood by the skilled person that the connection arrangement can be any form of connection between the magnetic plate and the linkage, and whilst certain examples of types of connection arrangement are disclosed herein, these are by way of example only. The movement of the linkage can be a vertical movement aimed to push or pull the safety brake into engagement with the elevator rail. In other examples the movement of the linkage can be in any direction so as to move the safety brake into a position of engagement with the elevator guide rail.

According to a first set of examples, the connection arrangement is configured translate a horizontal displacement of the magnetic plate to a vertical movement of the linkage. The connection arrangement may be in the form of a scissor mechanism which translates a horizontal movement of the magnetic plate to a vertical movement of the linkage. Such an arrangement can be advantageous in places where there is limited vertical space for placing the frictionless electronic safety actuator relative to a safety brake.

In some examples of the first set of examples, the connection arrangement includes a compression spring arrangement configured to translate a horizontal displacement of the magnetic plate to a vertical movement of the linkage; wherein the compression spring arrangement generates a spring bias to return to a relaxed state which actuates a vertical movement of the linkage to move a safety brake into frictional engagement with an elevator guide rail. The use of a compression spring arrangement means a bias can be introduced, where the spring biases the magnetic plate into a position where the linkage actuates the safety brake when the connection arrangement is free to move. This can be due to the removal of a magnetic force which the electromagnet can selectively operate to keep the magnetic plate in a position where the linkage is not actuated i.e. a normal operating position. When the magnetic field is removed or reversed the magnetic plate can be pulled by the bias of the compression spring arrangement into a position which actuates the linkage. In some examples the compression spring arrangement comprises at least one leaf spring. In some examples the compression spring arrangement comprises a buckling spring.

In some examples of the first set of examples, the connection arrangement includes a plurality of leaf springs connected in series to form a concertina in a vertical direction with one end fixed and one end movable in vertical direction; and a linkage connection point located on the movable end of the concertina. Optionally the plurality of leaf springs can have a relaxed state which biases towards a position which actuates the linkage, and during normal operation the magnetic force between the at least one electromagnet and the magnetic plate can pull the plurality of leaf springs against their bias in a horizontal direction. Optionally the plurality of leaf springs comprise thin metal sheet plates. Such leaf springs may be able to deform easily without exceeding their yield strength but being able to provide adequate spring bias force and displacement distance. It will be appreciated that the use of a plurality of leaf springs allows for a small horizontal deflection to be translated into a larger vertical deflection, which can provide a large actuation distance for the linkage.

In some examples of the first set of examples, of the first set of examples, the vertical movement of the plurality of leaf springs is guided so a first side of the plurality of leaf springs is fixed in the horizontal direction and guided in the vertical direction, and a second side of the plurality of leaf springs is guided in the vertical direction and movable in the horizontal direction; and wherein the second side of the plurality of leaf springs is attached to the magnetic plate, and horizontal movement is determined by the operation of the at least one electromagnet. This fixation helps to prevent losses in vertical movement due to an unbalanced spring, thereby increasing the transfer efficiency of the spring force from the horizontal direction to the vertical direction.

In some examples of the first set of examples, the at least one electromagnet is operable to remove or reverse the magnetic field in order to displace the magnetic plate. It will be appreciated that this can mean a triggering of the frictionless electronic safety actuator. The plurality of leaf springs can be allowed to return to their relaxed state, by reducing the horizontal deflection, wherein the reduction in horizontal direction is translated to a movement in the vertical direction so as to actuate the linkage. This triggered state being the natural state of the springs (either a plurality of leaf spring or any other form of compression spring), has the advantage of making the movement to the triggered position as efficient as possible. In addition, it will be appreciated that this can introduce a failsafe, as if the at least one electromagnet were to lose power the frictionless electronic safety actuator can automatically trigger the safety brakes.

In some examples of the first set of examples, the magnetic plate comprises at least one permanent magnet. By using at least one permanent magnet it will be appreciated that the power requirement for the frictionless electronic safety actuator can be greatly reduced, as continuous power is not required to stop the actuation of the linkage, instead only a small amount of power is required for the release of the magnetic plate. Optionally the attractive magnetic force between the permanent magnet and the electromagnet when no current is running through the electromagnet is greater than the spring force of the plurality of leaf springs.

In the examples where the magnetic plate comprises at least one permanent magnet, the arrangement is similar to that of many traditional ESA systems (albeit with actuation now taking place in a frictionless way). This means that existing ESA layouts can be retained. It will be appreciated that the operation of the at least one electromagnet may also be similar to that of many traditional ESA systems and so may allow for an easy upgrade to a frictionless ESA as disclosed herein.

In some examples of the first set of examples, the at least one electromagnet is operable to produce a magnetic field to repel the magnetic plate. It will be appreciated that when the magnetic plate additionally comprises at least one permanent magnet a magnetic field is required to move the magnetic plate from the normal operating position into a triggered position. This can be aided by the spring bias of the compression spring arrangement, so as to efficiently actuate the linkage.

In some examples of the first set of examples, the at least one electromagnet is operable to produce a magnetic field to reset the magnetic plate; wherein the magnetic plate is moved in the horizontal direction against the bias of the compression spring arrangement. It will be appreciated that such a movement can move the magnetic plate from a triggered position back to the normal operating position. Optionally, the magnetic plate can be kept in place by the magnetic force of the at least one electromagnet, during normal operation.

In the first set of examples the connection arrangement is arranged to translate a horizontal movement of the magnetic plate to a vertical movement of the linkage. Advantageously a small horizontal movement can be translated into a larger vertical movement for the actuation of the linkage. Some configurations of elevator components and their safety brakes may have space constraints which this first example of frictionless electronic safety actuator is more suited to. There are however various alternative connection arrangements which are suitable for use in the frictionless electronic safety actuator. A second set of examples of an implementation of the frictionless electronic safety actuator are hereby given.

According to a second set of examples the at least one electromagnet is configured to move the magnetic plate and its attached connection arrangement in a vertical direction to directly displace the linkage in the vertical direction. It will be appreciated that an arrangement such as this can actuate the linkage and activate a safety brake in an uncomplicated way. In this second set of examples the connection arrangement can be relatively simple, with fewer parts which may be causes of error.

In some examples of the second set of examples, a single electromagnet is configured to move the magnetic plate in a vertical direction to vertically displace the linkage.

In some examples of the second set of examples, a pair of electromagnets are positioned vertically displaced so as to selectively produce magnetic forces to displace the magnetic plate vertically between the two electromagnets so as to actuate the linkage.

It will be appreciated, that an electromagnet may be configured to push the magnetic plate upwards in a vertical direction to vertically displace the linkage, and/or an electromagnet may be configured to push the magnetic plate upwards in a vertical direction to vertically displace the linkage. It will also be appreciated that the use of a pair of magnets used to displace the magnetic plate between them will require smaller electromagnets, and may require less power than a single electromagnet. The combination of magnetic fields produced by a pair of electromagnets can be more easily tuned to control the movement of the magnetic plate, and allow for more efficient actuation of the linkage.

In some examples of the second set of examples, the magnetic plate is displaced towards a stop, wherein the stop is resiliently mounted. A resilient mounting of the stop can allow for over-travel in the displacement of the magnetic plate, which can allow for larger tolerances in the connection of the linkage to the safety brake, where variable actuation distances can be absorbed. The stop can be a magnetic plate, or a permanent magnet, or an electromagnet.

In some examples of the second set of examples, the resilient mounting of the stop is arranged to relax to assist with reset of the magnetic plate. Optionally, the resilient mounting can be a spring.

In some examples of the second set of examples, the at least one electromagnet is operable to produce a magnetic field to displace the magnetic plate upwards in the vertical direction, i.e. to actuate the linkage. It will be appreciated that the displacement of the magnetic plate can be caused by various combinations of magnetic fields, depending on the number of electromagnets used in the frictionless electronic safety actuator. Where a single electromagnet is used at the bottom a repulsive magnetic field can be produced to repel the magnetic plate upwards. Where a single electromagnet is used at the top an attractive magnetic field can be produced to attract the magnetic plate upwards. Where a pair of electromagnets are used a combination of fields can be produced to produce the upwards movement.

In some examples of the second set of examples, the at least one electromagnet is operable to remove or reverse the magnetic field to displace the magnetic plate. It will be appreciated that the magnetic plate can fall back down to the normal operating position under the force of gravity. This means the reset of the frictionless electronic safety actuator is easily performed without external influence. The magnetic plate can be actively displaced downwards by the operation of the at least one electromagnet, which aids the natural movement of the magnetic plate with gravity.

In some examples of the second set of examples, the magnetic plate is a permanent magnet. A permanent magnet can create a larger magnetic field, an easier interaction between the magnetic plate and the at least one electromagnet. As such less power may be required for the at least one electromagnet to move the magnetic plate into the triggered position.

DETAILED DESCRIPTION

Certain preferred examples of this disclosure will now be described, by way of example only, with reference to the accompanying drawings, in which.

Figure 1:
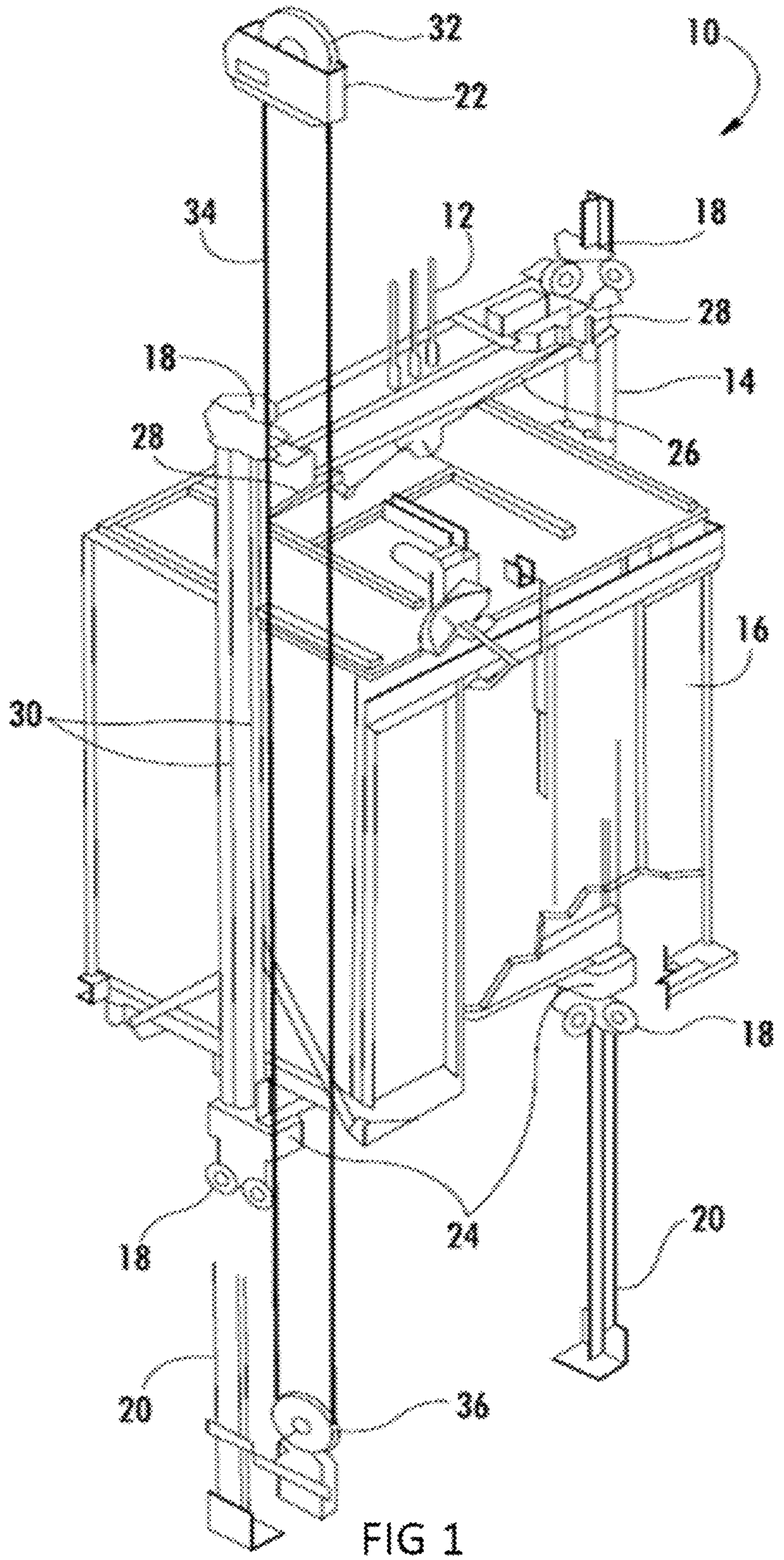
FIG. 1 shows an example of an elevator system employing a mechanical governor.

FIG. 1 shows an elevator system, generally indicated at 10. The elevator system 10 includes cables or belts 12, a car frame 14, an elevator car 16, roller guides 18, guide rails 20, a governor 22, and a pair of safety brakes 24 mounted on the elevator car 16. The governor 22 is mechanically coupled to actuate the safety brakes 24 by linkages 26, levers 28, and lift rods 30. The governor 22 includes a governor sheave 32, rope loop 34, and a tensioning sheave 36. The cables 12 are connected to the car frame 14 and a counterweight (not shown) inside a hoistway. The elevator car 16, which is attached to the car frame 14, moves up and down the hoistway by a force transmitted through the cables or belts 12 to the car frame 14 by an elevator drive (not shown) commonly located in a machine room at the top of the hoistway. The roller guides 18 are attached to the car frame 14 to guide the elevator car 16 up and down the hoistway along the guide rails 20. The governor sheave 32 is mounted at an upper end of the hoistway. The rope loop 34 is wrapped partially around the governor sheave 32 and partially around the tensioning sheave 36 (located in this example at a bottom end of the hoistway). The rope loop 34 is also connected to the elevator car 16 at the lever 28, ensuring that the angular velocity of the governor sheave 32 is directly related to the speed of the elevator car 16.

In the elevator system 10 shown in FIG. 1, the governor 22, a machine brake (not shown) located in the machine room, and the safety brakes 24 act to stop the elevator car 16 if it exceeds a set speed as it travels inside the hoistway. If the elevator car 16 reaches an over-speed condition, the governor 22 is triggered initially to engage a switch, which in turn cuts power to the elevator drive and drops the machine brake to arrest movement of the drive sheave (not shown) and thereby arrest movement of elevator car 16. If, however, the elevator car 16 continues to experience an overspeed condition, the governor 22 may then act to trigger the safety brakes 24 to arrest movement of the elevator car 16 (i.e. an emergency stop). In addition to engaging a switch to drop the machine brake, the governor 22 also releases a clutching device that grips the governor rope 34. The governor rope 34 is connected to the safety brakes 24 through mechanical linkages 26, levers 28, and lift rods 30. As the elevator car 16 continues its descent, the governor rope 34, which is now prevented from moving by the actuated governor 22, pulls on the operating levers 28. The operating levers 28 actuate the safety brakes 24 by moving the linkages 26 connected to the lift rods 30, and the lift rods 30 cause the safety brakes 24 to engage the guide rails 20 to bring the elevator car 16 to a stop.

It will be appreciated that, whilst a roped elevator is described here, the examples of an electronic safety actuator described here will work equally well with a ropeless elevator system e.g. hydraulic systems and systems with linear motors.

Whilst mechanical speed governor systems are still in use in many elevator systems, others are now implementing electronically actuated systems to trigger the emergency safety brakes 24. Most of these electronically actuated systems utilize use friction between a magnet and the guide rail 20 to then mechanically actuate a linkage to engage the safety brakes 24. Examples of an electronic safety actuator are disclosed herein which do not utilize friction against the guide rail 20 to actuate the safety brakes 24.

Figure 2A:
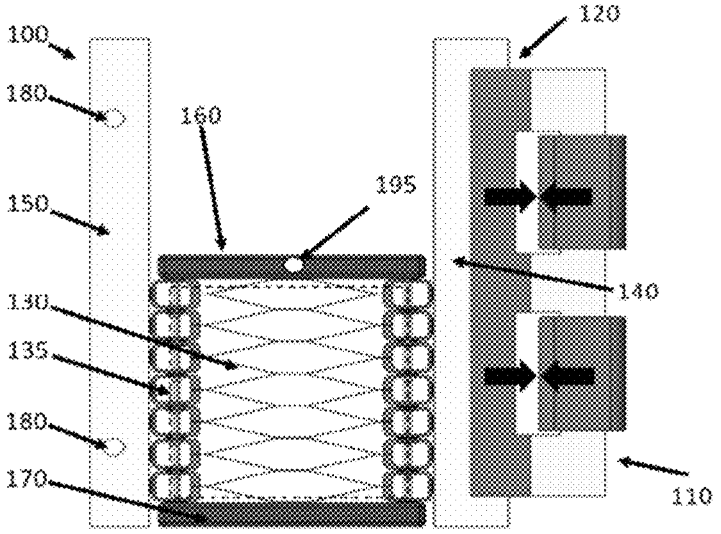
FIG. 2A shows a side on schematic of a frictionless electronic safety actuator during normal operation of an elevator according to a first example.
Figure 2B:
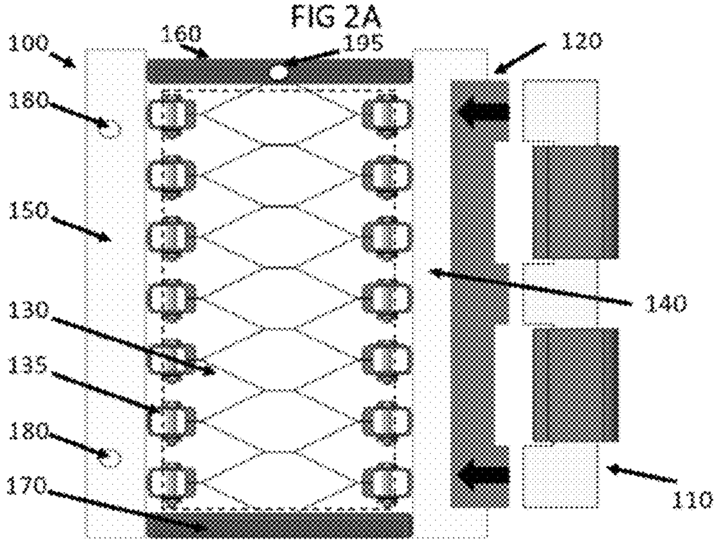
FIG. 2B shows a side on schematic of a frictionless electronic safety actuator in a tripped position according to the first example.
Figure 3:
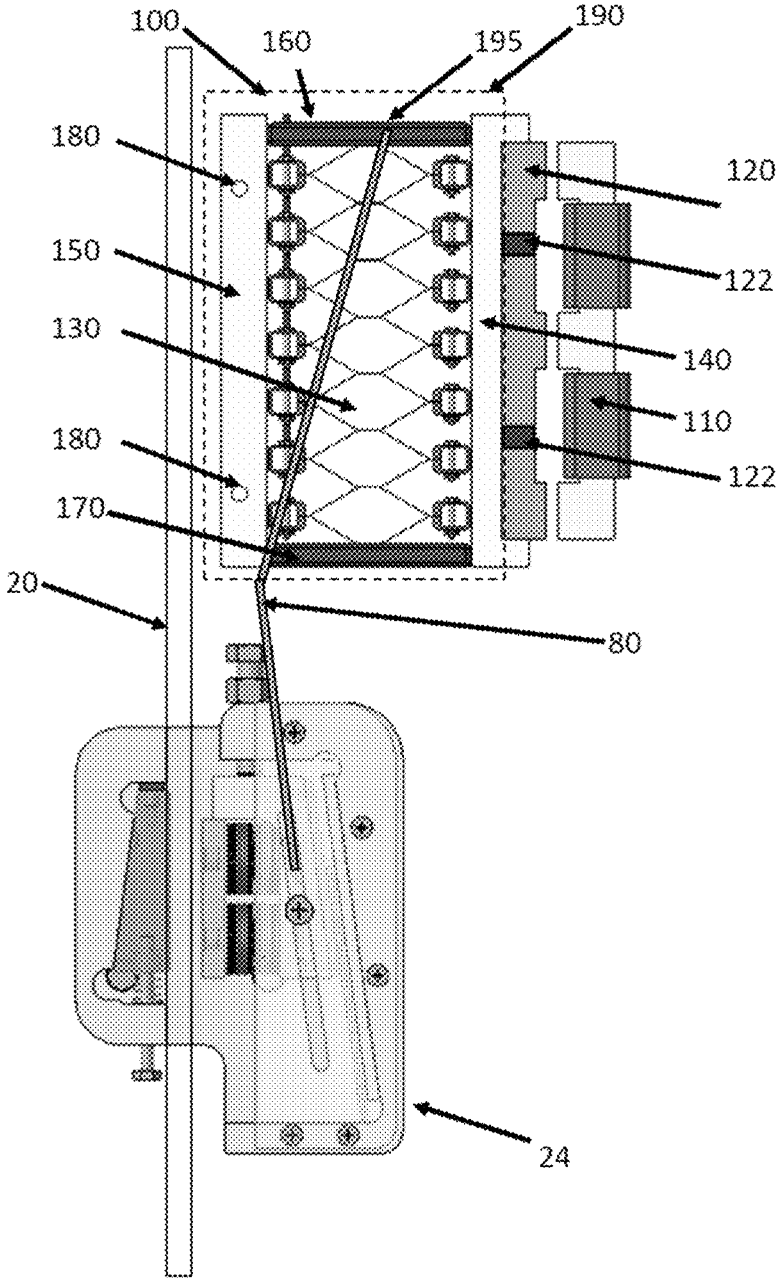
FIG. 3 shows a side on schematic of a frictionless electronic safety actuator connected to an elevator safety brake in a tripped position according to the first example.

FIG. 2A shows a first example of a frictionless electronic safety actuator 100 during normal elevator operation, and FIG. 2B shows the first example of the frictionless electronic safety actuator 100 in a triggered position. FIG. 3 shows the triggered frictionless electronic safety actuator 100 situated above a safety brake 24 in a tripped position. The frictionless electronic safety actuator 100 includes at least one electromagnet 110 and a magnetic (e.g. steel) plate 120. The magnetic plate 120 is attached to a connection arrangement 190 that includes a plurality of leaf springs 130 connected in series to form a concertina 135 with a fixed side 150 with fixation holes 180, a movable side 140, a fixed bottom plate 170, and a moveable top plate 160 with a linkage connecting point 195.

In the example shown in FIGS. 2A, 2B and 3, the plurality of leaf springs 130 are assembled together in the form of a plurality of elliptic leaf springs connected together in series at their apices to form a concertina 135, where a first side of each leaf spring 130 is fixed on the horizontal axis, but movable on the vertical axis, and a second side, opposite to the first side, is movable on both the horizontal and vertical axes. The first side of each leaf spring 130 is connected to the fixed side 150 of the connection arrangement 190 via a guide (not shown) to allow movement in the vertical direction. This fixed side 150 is configured to be attached to an elevator component, i.e. an elevator car 16 or a counterweight, via the fixation holes 180. The second side of each leaf spring 130 is connected via a guide (not shown) to the movable side 140 of the connection arrangement 190, which is attached to the magnetic plate 120. In some examples the magnetic plate 120 is a steel plate. The concertina 135 of leaf springs 130 is also attached to the fixed bottom plate 170 and the moveable top plate 160, which both extend horizontally between the movable side 140 and the fixed side 150. The fixed bottom plate 170 is fixed relative to the fixed side 150, and the top plate 160 moves vertically with the movement of the plurality of leaf springs 130. A linkage 80 (not shown in FIG. 2A and FIG. 2B) is connected to the top plate 160 at a linkage connecting point 195. The linkage 80 connects the frictionless electronic safety actuator 100 to a safety brake 24 e.g. the safety brake 24 mounted below the electronic safety actuator 100 as shown in FIG. 3.

The plurality of leaf springs 130 are designed to deform easily without exceeding their yield strength, whilst still being able to provide the required actuation distance and a spring force capable of actuating the linkage 80. In some examples the plurality of leaf springs 130 comprise thin metal sheet plates. Various alternative compression spring arrangements may be contemplated, such as a buckling spring instead of the concertina of leaf springs. In some examples a single leaf spring may be used.

The at least one electromagnet 110 is positioned relative to the magnetic plate 120 such that, when the at least one electromagnet 110 is operated, the produced magnetic field acts on the magnetic plate 120. In the example of FIGS. 2A, 2B and 3, the electromagnet 110 is positioned horizontally adjacent to the magnetic plate 120. The electromagnet 110 is illustrated as having an E-shaped core with a pair of coils, but of course it may take any suitable form e.g. a straight core with a single coil or more than two coils.

FIG. 2A shows the frictionless electronic safety actuator 100 during normal elevator operation. In this example the electromagnet 110 is operated to produce a magnetic field which acts upon the magnetic plate 120 with a horizontal magnetic force to pull the moveable side 140 of the connection arrangement 190 towards the electromagnet 110 and hence deflect the second side of the concertina 135 of the plurality of leaf springs 130 in a horizontal direction. The electromagnet 110 acts to pull the magnetic plate 120 and the moveable side of the concertina 135 of the plurality of leaf springs 130 horizontally against the force of the plurality of leaf springs 130, and keep the concertina 135 of the plurality of leaf springs 130 in this position during normal operation of the elevator, as shown by the force arrows. As the leaf springs 130 are attached together at their apices in a concertina type arrangement, this horizontal pull causes a combinatory effect with the compression of the plurality of leaf springs 130 in the vertical direction.

FIG. 2B shows the frictionless electronic safety actuator 100 in a tripped position, which can be used to actuate the safety brake 24 (seen in FIG. 1). In this example the electromagnet 110 is operated to remove the magnetic field acting upon the magnetic plate 120, so as to allow the moveable side 140 of the connection arrangement 190 to be pulled away from the electromagnet 110 by the concertina 135 of the plurality of leaf springs 130 exerting a vertical force to recover to their relaxed state, thus reducing their horizontal deflection. This horizontal movement of the magnetic plate 120 is shown by the arrows. This produces a vertical movement in the top plate 160, which in turn moves the linkage connecting point 195 so that a linkage 80 (not shown in FIGS. 2A and 2B) is pulled upwards as to actuate the safety brake 24.

In this example the electromagnet 110 produces an attractive force upon the magnetic plate 120 whilst the elevator is in normal operation (FIG. 2A). When the safety brakes 24 need to be engaged, the electromagnet 110 stops producing the attractive force and the force of the plurality of leaf springs 130 actuates the linkage pulling on the safety brake 24. This can act as a failsafe in case of a loss of power, as when the electromagnet 110 loses power, the safety brake 24 will be actuated automatically.

In some examples the at least one electromagnet 110 is operated to actively repel the magnetic plate 120, providing additional force to the force of the plurality of leaf springs 130 to return to their relaxed state. This can speed up the process of actuating the safety brake 24.

To reset the frictionless electronic safety actuator 100 the at least one electromagnet 110 is operated to produce a magnetic force to displace the magnetic plate 120 horizontally back to its original position, against the bias of the concertina 135 of the plurality of leaf springs 130.

In the example shown in FIGS. 2A and 2B the electromagnet 110 is operated to produce an attractive magnetic field which acts on the magnetic plate 120 to pull the magnetic plate 120, back to its normal operating position. This pulls the plurality of leaf springs 130 into a deflected position.

FIG. 3 shows an example of the frictionless electronic safety actuator 100 situated above a safety brake 24 in a tripped position. A linkage 80 is shown attached at one end to the top plate 160 at the linkage connection point 195, and at the other end to the safety brake 24. The linkage has actuated the safety brake 24. The connection arrangement 190 is illustrated which comprises the plurality of leaf springs 130, fixed side 150 with fixation holes 180, movable side 140, fixed bottom plate 170, top plate 160 and linkage connecting point 195. In this example the magnetic (e.g. steel) plate 120 also comprises at least one permanent magnet 122.

In the example shown in FIG. 3, the magnetic plate 120 comprises at least one permanent magnet 122. The permanent magnets 122 act to aid the attraction of the magnetic plate 120 to the at least one electromagnet 110. In this example constant current is not required in the at least one electromagnet 110 during normal operation of the elevator, and the at least one electromagnet 110 is only operated to provide a force to help the plurality of leaf springs 130 return to their relaxed state, and actuate the safety brake 24.

In the example of FIG. 3, to reset the frictionless electronic safety actuator 100 the electromagnet 110 is switched off to allow the magnetic plate 120 to displace horizontally back to its normal operating position. In some examples the electromagnet 110 is operated to produce a force to displace the magnetic plate 120 horizontally back to its original position, to aid with force provided by the at least one permanent magnet 122. Once the magnetic plate 120 has returned to its normal operating position the electromagnet 110 can be turned off. In this example minimal power is required to operate the frictionless electronic safety actuator 100, which improves operational efficiency of the system.

Figure 4:
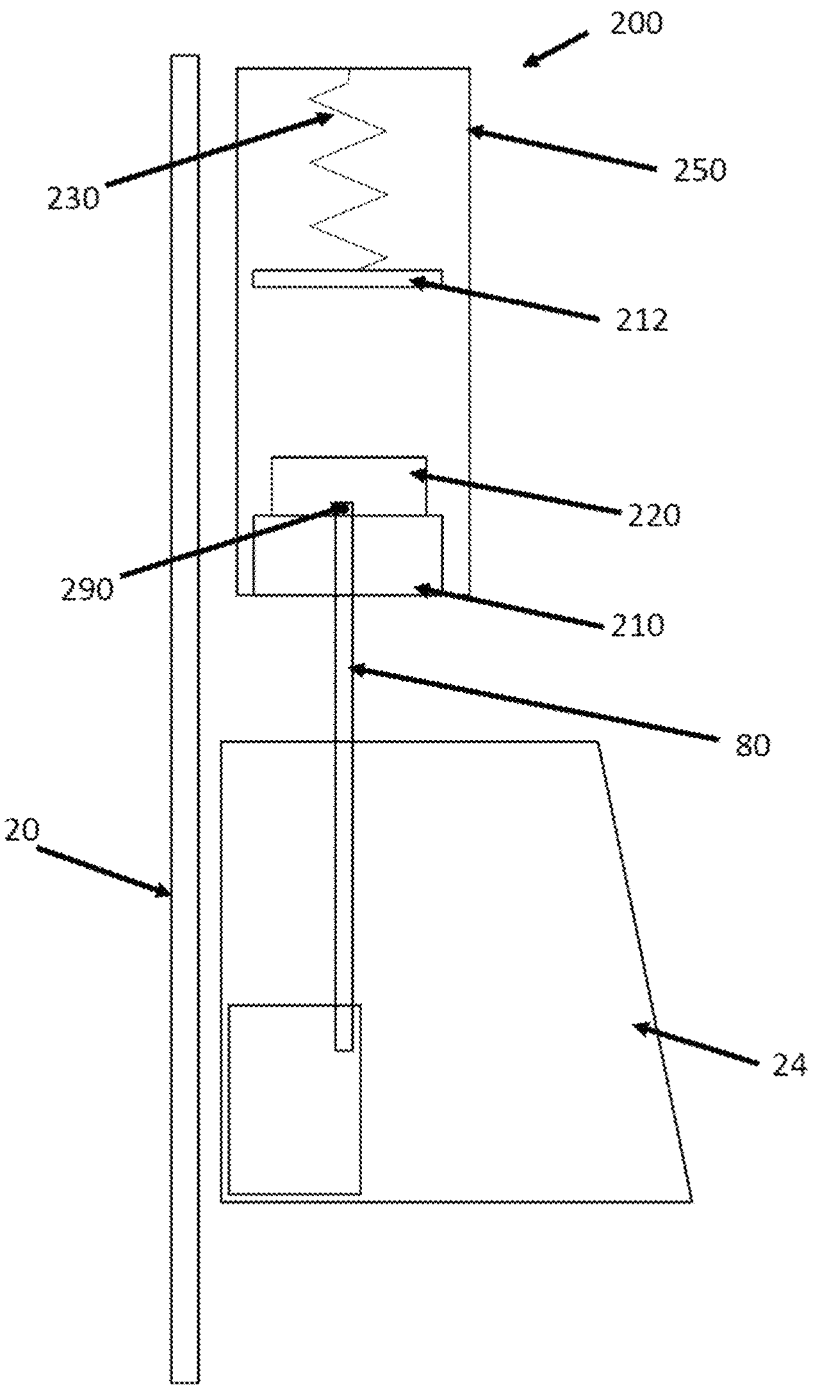
FIG. 4 shows a side on schematic of a frictionless electronic safety actuator connected to a safety brake during normal operation of an elevator according to a second example.
Figure 5:
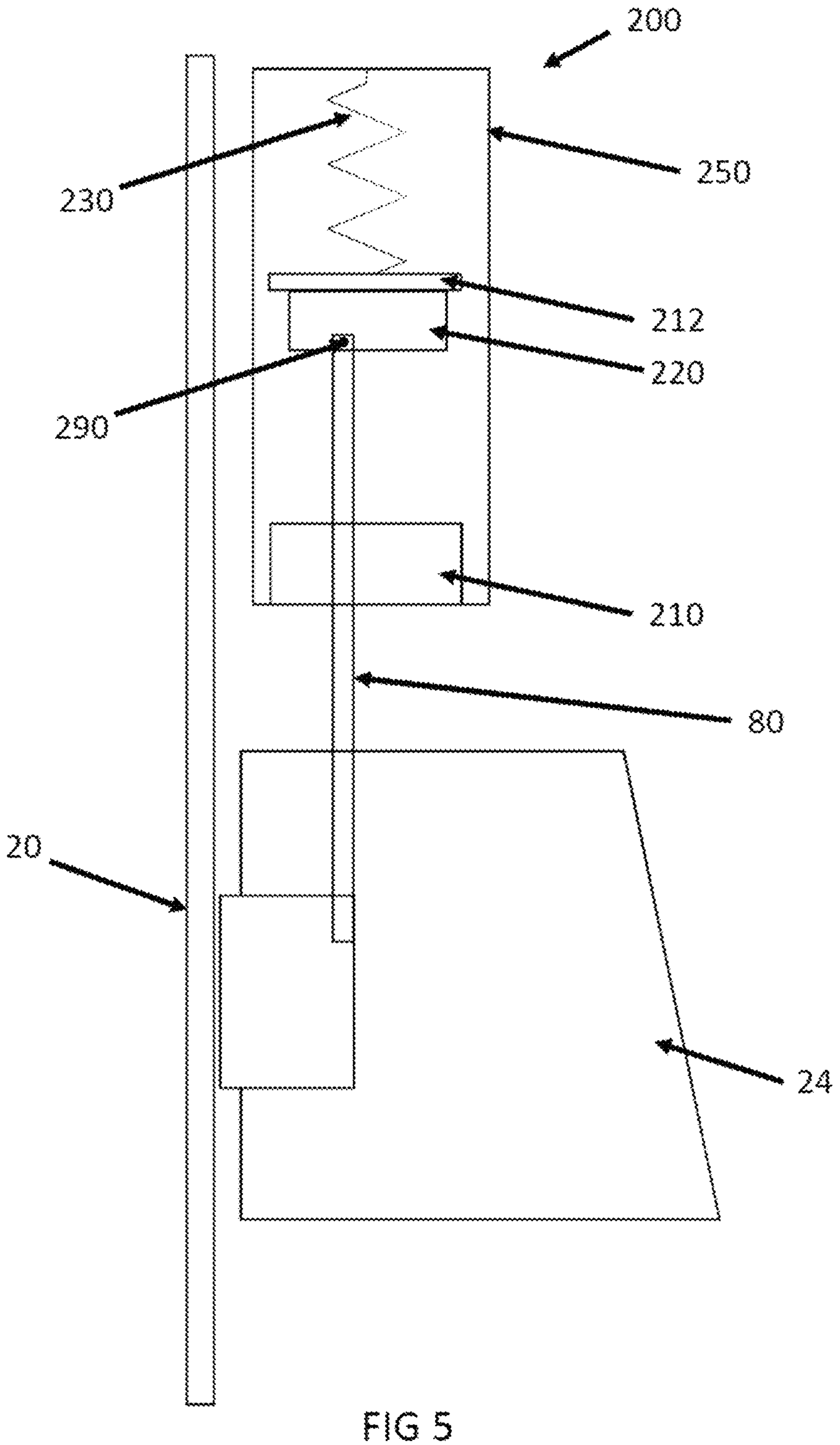
FIG. 5 shows a side on schematic of a frictionless electronic safety actuator connected to a safety brake in a semi-tripped position according to the second example.
Figure 6:
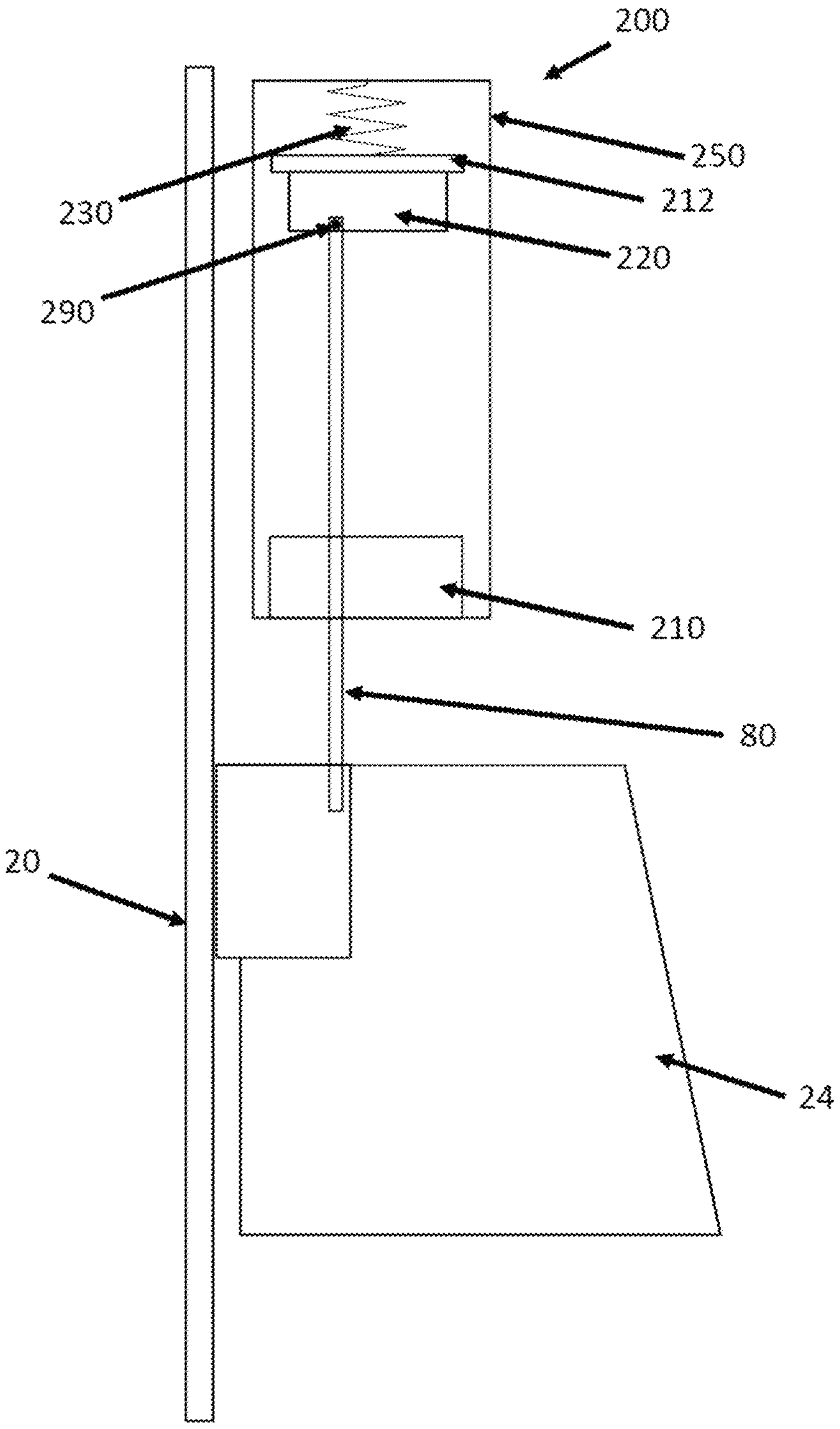
FIG. 6 shows a side on schematic of an electronic safety actuator connected to a safety brake in a tripped position according to the second example.

FIGS. 4, 5 and 6 show a second example of a frictionless electronic safety actuator 200. The frictionless electronic safety actuator 200 comprises a first magnetic plate 210, a second magnetic plate 220, a stop 212, and a spring 230, located within a housing 250. A connection arrangement 290 connects the second magnetic plate 220 to a linkage 80 which is configured to actuate a safety brake 24. The connection arrangement 290 may be any form of connection which allows the movement of the second magnetic plate 220 to actuate the linkage 80. In this example the connection arrangement 290 is a pin.

In an example the first magnetic plate 210 is an electromagnet. In another example the stop 212 is an electromagnet. In another example both the first magnetic plate 210 and the stop 212 are electromagnets. The electromagnet(s) may take any suitable form e.g. a straight core with a single coil or more than one coil. The electromagnet(s) 210, 212 are positioned so as to act upon the second magnetic plate 220, and move the second magnetic plate 220 from a rest position during normal operation as seen in FIG. 4, to an actuated position vertically displaced upwards from the rest position as shown in FIG. 6. The second magnetic plate 220 can be made of a ferrous material, possible including one or more permanent magnets, or the second magnetic plate 220 can be a permanent magnet.

Whilst in some examples the stop 212 is an electromagnet, it can be any form of physical stop. In some examples the stop 212 is a permanent magnet. In some examples the stop is resiliently mounted, preferably so that the resilient mounting can assist with the reset of the magnetic plate. In the example shown in FIGS. 4, 5 and 6 the resilient mounting is a spring 230, however other types of resilient mounting may also be suitable, e.g. an actuator, a hydraulic ram, a pneumatic ram etc.

In the example shown in FIGS. 4, 5, and 6, the first magnetic plate 210 is located at the bottom of the housing 250 and during normal operation of the elevator the second magnetic plate 220 rests above the first magnetic plate 210. The stop 212 is attached to the top of the housing 250 via a spring 230.

When the frictionless electronic safety actuator 200 activates, the electromagnet(s) are operable to produce a force which moves the second magnetic plate 220, from its resting position as shown in FIG. 4, upwards towards the stop 212. This movement actuates the linkage 80, which pulls the safety brake 24, as shown in FIG. 5. The movement is then absorbed by a compression of the spring 230, as shown in FIG. 6. The stop 212 restricts the upwards movement of the second magnetic plate 220.

The use of the spring 230 allows for a shortened distance between the first magnetic plate 210 and stop 212, with space for large actuation distances to be absorbed by the compression of the spring 230, when the second magnetic plate 220 is pushed upwards by the electromagnet of the first magnetic plate 210. The spring 230 can also absorb some of the force of the movement of the second magnetic plate 220, preventing damage of the stop 212 and the second magnetic plate 220. It also aids with reset. Whilst a spring 230 is discussed with reference to this example, it will be appreciated by a person skilled in the art that various types of resilient mountings may be suitable.

In the example, where both the first magnetic plate 210 and the stop 212 are electromagnets, the first magnetic plate 210 can be operated to repel the magnetic plate 220, and the stop 212 can be operated to attract the magnetic plate 220, increasing the efficiency of the actuation of the safety brake 24. In this example each electromagnet requires less power than a single electromagnet would require.

In the situation where the first magnetic plate 210 is an electromagnet, the stop 212 can be a permanent magnet, configured to attract the second magnetic plate 220. The magnetic attraction between the second magnetic plate 220 and the stop 212 can help prevent the second magnetic plate 220 from shifting downwards with a pull from the safety brake 24, when the safety brake 24 exerts a frictional force against the guide rail 20.

In some examples no power is needed during normal operation, as the second magnetic plate 220 is kept in place by its own weight. Advantages for this include improved energy efficiency. In an additional example, the natural magnetic force between the first magnetic plate 210 and the second magnetic plate 220 provide additional force to keep the second magnetic plate 220 in place, even when the electromagnet of the first magnetic plate 210 is not powered.

In an example, the electromagnet of the first magnetic plate 210 can be operable to produce a magnetic field to keep the second magnetic plate 220 in place during normal operation. This prevents any abnormal movement of the elevator car 16 from moving the second magnetic plate 220 in a way which could accidentally trigger the safety brake 24.

In the examples shown in FIGS. 4, 5 and 6, to reset the frictionless electronic safety actuator 200 from the triggered state as seen in FIG. 6, back to the position as in FIG. 4 during normal operation, the electromagnet(s) are operated to produce a reversed magnetic field to attract the second magnetic plate 220 back into its normal operating position. The force of the spring 230 can aid with this movement, assisting gravity.

The frictionless electronic safety actuator 100, 200 is fixed to the elevator car 16 and is positioned relative to the safety brake 24 such that the linkage can actuate the safety brake 24. The frictionless electronic safety actuator 100, 200 is positioned to make no direct contact with the elevator rail 20.

It will be appreciated by those skilled in the art that many forms of linkage 80 between the frictionless electronic safety actuator 100, 200 and the safety brake 24 would be suitable for actuating the safety brake 24 based on the movement of the frictionless electronic safety actuator 100, 200. Additionally a variety of types of safety brakes 24 are suitable for actuation by a linkage 80 in this manner, e.g. a safety brake 24 using a wedge or a roller. In the examples shown the safety brake 24 is positioned below the frictionless electronic safety actuator 100, 200, however it will be appreciated that other configurations would also be possible, for example, the frictionless electronic safety actuator 100, 200 may even be positioned to one side of or below the safety brake 24, e.g. depending on the linkage used.

The above described examples have a number of advantages over traditional electronic safety actuators. The actuation of the safety brake has no dependence on guide rail 16 condition, or the speed of the elevator car. Additionally the response time to braking will be improved as actuation is not dependent on a friction force between the electronic safety actuator and the guide rail 20. Movement of the car will also not affect the actuation of the safety brakes, as the actuation of the safety brakes is fully independent of any interaction between the elevator car 16 and the guide rails 20. This can improve the safety of the whole elevator system. The frictionless electronic safety actuator may also have the advantage of not damaging the guide rail.

It will be appreciated by those skilled in the art that the disclosure has been illustrated by describing one or more specific aspects thereof, but is not limited to these aspects;

many variations and modifications are possible, within the scope of the accompanying claims.

What is claimed is:

1. A frictionless electronic safety actuator (100, 200) for use in an elevator system, comprising:

at least one electromagnet (110; 210, 212), and a magnetic plate (120; 220) attached to a connection arrangement (190; 290);

wherein the connection arrangement (190; 290) is configured to connect the magnetic plate (120; 220) to a linkage (80) that is actuatable so as to move a safety brake (24) into frictional engagement with an elevator guide rail (20); and wherein the at least one electromagnet (110; 210, 212) is operable to selectively produce a magnetic force which acts upon the magnetic plate (120; 220) to displace the magnetic plate (120; 220) and thereby move the connection arrangement (190; 290) to actuate the linkage (80) without the magnetic plate (120; 220) coming into frictional engagement with the elevator guide rail (20);

wherein the connection arrangement (190) includes a plurality of leaf springs (130) connected in series to form a concertina (135) in a vertical direction with one end fixed and one end movable in vertical direction and a linkage connection point (195) located on the movable end of the concertina (135).

2. The frictionless electronic safety actuator (100) according to claim 1, wherein the connection arrangement (190) is configured translate a horizontal displacement of the magnetic plate (120) to a vertical movement of the linkage (80).

3. The frictionless electronic safety actuator (100) according to claim 2, wherein the connection arrangement (190) includes a compression spring arrangement (130) configured to translate a horizontal displacement of the magnetic plate (120) to a vertical movement of the linkage (80); and wherein the compression spring arrangement (130) generates a spring bias to return to a relaxed state which actuates a vertical movement of the linkage (80) to move a safety brake (24) into frictional engagement with an elevator guide rail (20).

4. The frictionless electronic safety actuator (100) according to claim 1, wherein the vertical movement of the plurality of leaf springs (130) is guided so a first side of the plurality of leaf springs (130) is fixed in the horizontal direction and guided in the vertical direction, and a second side of the plurality of leaf springs (130) is guided in the vertical direction and movable in the horizontal direction; and wherein the second side of the plurality of leaf springs (130) is attached to the magnetic plate (120), and horizontal movement is determined by the operation of the at least one electromagnet (110).

5. The frictionless electronic safety actuator (100) according to claim 1, wherein the magnetic plate (120) comprises at least one permanent magnet (122).

6. The frictionless electronic safety actuator (100) according to claim 5, wherein the at least one electromagnet (110) is operable to produce a magnetic field to repel the magnetic plate (120).

7. The frictionless electronic safety actuator (100) according to claim 1, wherein the at least one electromagnet (110) is operable to produce a magnetic field to reset the magnetic plate (120); wherein the magnetic plate (120) is moved in the horizontal direction against the bias of the compression spring arrangement (130).

8. The frictionless electronic safety actuator (100, 200) according to claim 1, wherein the at least one electromagnet (110; 210, 212) is operable to remove or reverse the magnetic field in order to displace the magnetic plate (120; 220).

* * * * *